United States Patent Office 3,054,668
Patented Sept. 18, 1962

3,054,668
METHOD FOR KILLING AQUATIC VEGETATION
Melvin J. Josephs, Midland, Mich., assignor to The Dow Chemical Company, Midland, Mich., a corporation of Delaware
No Drawing. Filed May 5, 1960, Ser. No. 26,950
4 Claims. (Cl. 71—2.7)

This invention relates to herbicides and is particularly concerned with compositions and methods for control of aquatic plants. The expression "aquatic plants" as herein employed refers to vegetative organisms normally growing in water in which a major part of such organisms are normally largely submerged. Such submerged parts may be roots as in Lemna and Eichornia, or leaves as in Vallisneria, or entire plants such as Anacharis. The expression is inclusive of water plants such as Ceratophyllum spp. and Salvinia spp. which are normally free floating in their environing water as well as immersed species which are typically rooted in earth, such as Vallisneria spp. ("tape grass"), Potamogeton spp. ("pond weed"), and Lysimastrum spp., and species which appear to grow normally in all respects either free-floating or rooted, such as Cabomba spp., and Anacharis spp.

Aquatic plants growing out of place are commonly called weeds, and millions of dollars are expended annually for their control.

In irrigation ditches, canals, lakes, rivers and streams of pleasure and commerce, unwanted growth of aquatic plants hinders the flow of water and causes excessive sedimentation. Further, such growth causes high water loss from evaporation, and interferes with navigation. Further, such growth passing from maturity to death and decay, introduces into the water in which it appears biological processes which improverish the water of dissolved oxygen, thereby killing or driving away many kinds of desirable fish and other aquatic life.

It is an object of the present invention to provide a new and improved method for the control of the growth of aquatic plants. Another object is the provision of a method for the treatment of the aqueous growth medium environing the submerged portions of aquatic plants in a body of water to control the growth of the plants. A further object is the provision of a method which will control the growth of a large variety of aquatic plant species. An additional object is the provision of novel compositions to be employed in the new method for suppressing the growth of, and killing aquatic plants. Other objects will become apparent from the following specification and claims.

The aqueous growth medium of the aquatic plants to be controlled, according to the present invention, is described as "environing" such plants. In the present sense, the "environing" aqueous growth medium is essentially water through which nutriment and oxygen are transferred; through which required amounts of radiant energy are transferred; by which environmental temperatures are controlled. This environing water is often a convenient agency for the application of the aquatic herbicides of the present invention.

The term "control" in the sense in which it is used in the present specification and claims as a verb is intended to set forth, collectively, the actions of killing, inhibiting growth, inhibiting reproduction and proliferation, removing, destroying and otherwise diminishing the occurrence and activity of the controlled species, or the means employed for the achievement of such actions, or the results of such actions. While an eradicant kill and subsequent removal of the unwanted vegetation is considered to be the most desired result, the term "control" is held to be applicable to any of the stated actions, or any combination of them, or the means for their achievement or the results thereof. Specifically, in the present specification and claims, the term "control" is never intended in the sense of encouraging, invigorating, beneficiating, protecting, propagating, or increasing.

According to the present invention, it has been found that certain halopropionitriles corresponding to the formula $$XH_2C—CHX—C\equiv N$$

wherein X represents a halogen selected from the group consisting of chlorine and bromine are very toxic to aquatic plants.

It has been discovered, further, that when such compounds are contacted in relatively low concentration with aquatic plants of many species, the chemicals act promptly and effectively to kill such plants. It has been discovered, further, that the action to kill aquatic plants is advantageously manifest by compositions comprising such compounds together with herbicidal adjuvants. Such adjuvants may be diluents, carriers, excipients, wetting and dispersing agents, surfactants, synergists, and, if desired, cooperating pesticides such as insecticides, fungicides, molluscacides, icthycides, batrachycides, germicides, and the like.

It has been found to be a convenient and preferred method of practicing the present invention as a means of contacting the plant to be killed with the chemical, to introduce one or more of the compounds into the water adjacent to the said plant. The chemical in unmodified form may be introduced into the said water, or it may be introduced in the form of a composition wherein are also herbicidal adjuvants, whereby its distribution, dispersion, and contacting of plants is facilitated.

The present halopropionitriles are heavy, viscous liquids, soluble in many common organic solvents such as acetone, lower alkyl ethers, lower alkanols, and chlorinated hydrocarbons and of low solubility in water. The compounds are readily and conveniently adapted to be distributed in water to control aquatic weeds. Among the advantages of the present invention is the fact that the present aquatic herbicides are useful over a wide range of water temperatures. Thus, the treatment may be carried out at almost any water temperature which will permit the growth and development of aquatic plants, or may be initiated by distributing the compounds over winter ice whereby the desired control begins as the ice melts and the chemical enters the water. A still further advantage of the methods and compositions of the present invention is their ability to control a wide variety of aquatic plant species.

The contacting of the submerged portions of growing aquatic plants with an amount of the halopropionitrile effective to control the growth of the plant is essential for the practice of the present invention. The employment of more than minimal amounts, while wasteful, does not impair the effectiveness of this method. In general, good results are obtained when the compound is distributed in natural water environing growing aquatic plants in an amount of from about 0.1 to 100 or more parts per million parts by weight of the environing water. The minimum concentration to be employed is dependent upon various factors, such as the plant mass to be treated, and whether the exposure is carried out in a moving stream such as a river or in standing water such as a pond, and the amount and nature of suspended or dissolved matter present in the water. In standing relatively clean water, good results are obtained when employing minimum concentrations of the compound. In moving streams, or in waters heavy with dissolved or suspended matter, longer periods of contact or somewhat higher concentrations are required in order to provide that the undesired plant growth be contacted with a herbicidal amount of the nitrile compounds.

The method of the present invention may be carried out by distributing a growth-inhibiting amount of the nitrile compound or a composition containing the compound in water adjacent to the growing plants to be killed. In such usage, the compound substance may be modified with one or more of a plurality of additaments or herbicide adjuvants including water or inert organic solvents, surface active dispersing agents, finely divided solids, or sticking and adhering agents. Preferred compositions of the present invention comprise emulsifiable liquid concentrates and wettable powder concentrates. Such concentrates are readily and conveniently adapted to be distributed in water adjacent to aquatic plants to provide in the water growth-inhibiting concentrations of the toxicant.

The exact concentration of the nitrile compound to be employed in compositions for the treatment of aquatic plant infested loci is not critical and may vary provided the required concentration of effective agent is supplied in the water adjacent to the plants to be controlled. The concentration of toxicant in liquid compositions employed to supply the desired dosage generally is from 1 to 75 percent by weight of total composition. In finely divided solid compositions, the concentration of toxicant may be from about 1 to about 30 percent by weight. In compositions to be employed as concentrates, the toxicant oftentimes is present in a concentration of from 5 percent to the saturation of the composition. Liquid compositions containing the desired amount of the present nitrile compound may be prepared by dissolving the toxicant compound in an organic liquid such as a lower alkanol, an alkyl ether, acetone, toluene, methylene chloride, chlorobenzene, and petroleum distillate, or a mixture of two or more such liquids, or by dispersing the toxicant compound in water with the aid of a suitable surface active dispersing agent. The aqueous composition may contain one or more water-immiscible solvents for the present nitrile compounds. In such compositions, the carrier comprises an aqueous emulsion, that is, a mixture of water immiscible solvent, emulsifying agent, and water. The compositions should preferably be characterized by a density only slightly greater than water, and should contain sufficient of the dispersing and emulsifying agents to make the composition self-dispersing in water and thus give an initial dispersion in water which breaks to permit the present nitrile compounds to settle out of solution.

In the preparation of wettable powder compositions, the nitrile compound is dispersed in and on a finely divided inert solid such as bentonite, fuller's earth, attapulgite and other clays, diatomaceous earth, wood flour, and the like. Such compositions may contain other finely divided solid carriers such as vermiculite fines, talc and chalk. In such operations, the solid carrier may be mixed and mechanically ground with the dihalopropionitrile compound and surface-active dispersing agents.

The surface-active dispersing agents are generally employed in amount from about 1 to about 20 percent by weight of the combined weight of the agent and the nitrile compound in the composition. Dispersing and emulsifying agents which may be employed in the compositions include the condensation products of alkylene oxides with phenols and organic acids, alkyl aryl sulfonates, polyoxyalkylene derivatives of sorbitan esters, complex ether alcohols, mahogany soaps, and the like, such as those sold under the trademarks Tween, Span, Triton, Nacconal, and the like.

The method of the present invention is carried out by contacting the submerged portions of the plants to be controlled with a growth-inhibiting amount of the dihalopropionitrile compound. This is readily accomplished by introducing the nitrile compound or a composition containing such compound into water above a plant mass so as to permit dispersion of the compound or composition in the water adjacent to growing plants. The introduction of the toxicant into the water adjacent to and environing aquatic weeds may be accomplished conveniently by spraying or sprinkling the composition onto or beneath the surface of the water or by metering the composition into the vortex of a rapidly turning propeller, or into the wake behind a moving object such as a boat, to obtain maximum distribution of the compound in the water.

In moving watercourses, water flow may be employed to disperse and carry the nitrile compound. Thus, the toxicant may be introduced into the water in such manner that it is distributed into and over the plant growth area for a sufficient exposure time to kill the plant. In general, an exposure of 2 hours or more at the higher concentrations herein contemplated, results in complete control.

The following examples illustrate the invention but are not to be construed as limiting.

*Example 1*

In a representative operation, 0.4 part by weight of $\alpha,\beta$-dichloropropionitrile, 10 parts of an acetone solution containing 0.1 percent by weight of a dimeric alkylated aryl polyether alcohol (Triton X-155) and 90 parts of water were mixed together to provide a liquid water-dispersible concentrate. This concentrate was further diluted with water to prepare aqueous compositions containing 100 parts of toxicant per million parts of water. These compositions were employed for the treatment of the water weeds *Anacharis canadensis* and *Salvinia rotundifolia*, growing in a series of small tanks. In such operations, the aqueous compositions were poured into the tank to contact the plants with concentrations of 100 parts by weight of the stated nitrile compound per million parts of water. After 2 hours of exposure, the tanks were flushed and the water weeds washed and the tanks refilled with fresh water. Thereafter, the water was changed daily by overflow filling. Other tanks containing the named species were left untreated to serve as checks.

At regular intervals, observations were carried out to ascertain what control of growth had been obtained. Three weeks following the treating operations, the observations showed the control of the growth of all the named plant species was 100 percent; that is to say, all the treated plants had been killed. At the time of observation, the untreated check tanks were found to support luxurious, normal growth of the named plant species.

*Example 2*

In a further operation, 0.4 part by weight of $\alpha,\beta$-dibromopropionitrile, 10 parts of an acetone solution containing 0.1 percent by weight of a dimeric alkylated aryl polyether alcohol (Triton X-155) and 90 parts of water were mixed together to provide a liquid water-dispersible concentrate. This concentrate was further diluted with water to prepare aqueous compositions containing 25 parts by weight of toxicant per million parts of water. This composition was employed for the treatment of aquatic weeds of the genera Anacharis, Cabomba, and Salvinia growing in a small tank. In such operation, the composition was poured into the tank, the plants exposed to the composition for 1 hour. Thereafter, the plants were rinsed and the tank was flushed and refilled with fresh water which was changed daily by over-flow filling.

At regular intervals, observations were carried out to ascertain what control of growth had been obtained. Three weeks following the treating operation, there was found a 100 percent kill of all of the said plants. At the time of observation, the untreated check tanks were found to support luxurious and succulent growth of the plants.

*Example 3*

In a further operation, a concentrate composition prepared in the manner described in Example 2, employing as sole toxicant $\alpha,\beta$-dibromopropionitrile was employed in the manner described in the said example for control of growth of Anacharis, Cabomba and Salvinia. In such operations, the plants were exposed for 24 hours to a concentration of 10 parts of the toxicant per million parts aqueous composition. Three weeks following the treatment, there was found a 100 percent kill of each of the plant species. At the time of observation, the untreated check tank was found to support luxurious normal growth of all species.

*Example 4*

Fifty parts by weight of α,β-dichloropropionitrile and 5 parts by weight of Triton X–155 are mixed and blended together and thoroughly reduced to a powder in a ball mill to prepare a water dispersible concentrate powder.

An emulsifiable concentrate is prepared by mechanically mixing and blending together 25 parts by weight of α,β-dibromopropionitrile, 10 parts by weight of Triton X–155, and 65 parts by weight of xylene.

To prepare a concentrate composition in the form of a wettable powder, 25 parts by weight of α,β-dichloropropionitrile, 81 parts of fuller's earth, 2 parts of an alkyl aryl sulfonate (Nacconol NR) and 2 parts of a polymerized sodium salt of a substituted benzoid alkyl sulfonic acid (Daxad No. 27) are mechanically mixed and ground together.

Also, 20 parts by weight of α,β-dibromopropionitrile, 50 parts by weight of acetone, 10 parts of Triton X–155, and 200 parts of water are intimately blended together to prepare a water dispersible liquid concentrate composition. These concentrate compositions or aqueous dispersions thereof in a small quantity of water are adapted to be employed to distribute growth inhibitive amounts of the nitrile compound in water environing aquatic weeds.

The preparation of the herbicidal compounds to be employed in the manner of the present invention is carried out in manners known in the art. For example, see the Bulletin of the Chemical Society of France, [4] 27, page 904 (1920), "Mémoires," for a detailed description of an improved method of preparing α,β-dibromopropionitrile. The chlorine compound is prepared in a procedure analogous except that the halogen is introduced as a gas rather than as a liquid into the reaction mixture. α,β-Dichloropropionitrile boils at 98° C. and has a density of 1.38 at 24° C. as compared with water at 0° C.; α,β-dibromopropionitrile boils at 104–105° C. at a pressure of 20 millimeters mercury, and has a density of 1.55. The compounds possess distinct lachrymatory properties.

I claim:
1. A method useful for controlling the growth of aquatic plants which includes the step of contacting the submerged portions of said plants with a growth inhibiting amount of a compound corresponding to the formula

$$XH_2C-CHX-C\equiv N$$

wherein X represents a halogen selected from the group consisting of chlorine and bromine.

2. A method useful for controlling the growth of aquatic plants which includes the step of introducing into water adjacent to the submerged portions of the plants at least 0.1 part by weight of α,β-dichloropropionitrile per million parts of water.

3. A method useful for controlling the growth of aquatic plants which includes the step of introducing into water adjacent to the submerged portions of the plants at least 0.1 part by weight of α,β-dibromopropionitrile per million parts of water.

4. A method useful for controlling the growth of aquatic plants which includes the step of introducing into the water adjacent to the submerged portions of the plants a composition comprising at least one nitrile compound corresponding to the formula $$XH_2C-CHX-C\equiv N$$

wherein X represents a halogen selected from the group consisting of the chlorine and bromine as active toxicant in intimate admixture with a herbicide adjuvant, said composition being employed in an amount sufficient to supply at least 0.1 part of the nitrile compound per million parts by weight of the water.

References Cited in the file of this patent

UNITED STATES PATENTS

| | | |
|---|---|---|
| 2,390,470 | Sumner | Dec. 4, 1945 |
| 2,472,347 | Sexton | June 7, 1949 |
| 2,892,696 | Barrons | June 30, 1959 |

OTHER REFERENCES

Wain et al.: "The Chemistry and Mode of Action of Plant Growth Substances." Butterworths Scientific Publications, London, 1956, pages 187 to 194.

Walker in "Weeds," vol. 7, No. 3, pages 310 to 316, July 1959.

Santelmann in "Northeastern Weed Control Conference Proceedings," 9th, 1955, pages 21 to 29.